(12) United States Patent
Lee et al.

(10) Patent No.: US 9,944,253 B2
(45) Date of Patent: Apr. 17, 2018

(54) INFLATABLE BELT D-RING ASSEMBLY FOR A VEHICLE

(71) Applicant: Autoliv Development AB, Vårgårda (SE)

(72) Inventors: Jung Min Lee, Seoul (KR); Won Jae Lee, Wonju-si (KR); Gi Young Bae, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/889,208

(22) PCT Filed: Apr. 14, 2014

(86) PCT No.: PCT/KR2014/003164
§ 371 (c)(1),
(2) Date: Nov. 5, 2015

(87) PCT Pub. No.: WO2014/181971
PCT Pub. Date: Nov. 13, 2014

(65) Prior Publication Data
US 2016/0121845 A1    May 5, 2016

(30) Foreign Application Priority Data

May 6, 2013  (KR) .................. 10-2013-0050925

(51) Int. Cl.
*B60R 22/24* (2006.01)
*B60R 21/18* (2006.01)
*B60R 22/18* (2006.01)

(52) U.S. Cl.
CPC .............. *B60R 22/24* (2013.01); *B60R 21/18* (2013.01); *B60R 2022/1818* (2013.01); *B60R 2022/1837* (2013.01)

(58) Field of Classification Search
CPC . B60R 22/24; B60R 22/03; B60R 2022/1818; B60R 2022/1837
See application file for complete search history.

(56) References Cited

U.S. PATENT DOCUMENTS

| | | | | |
|---|---|---|---|---|
| 4,191,400 A | * | 3/1980 | Smith | ..................... B60R 22/24 280/808 |
| 4,322,097 A | * | 3/1982 | Provensal | ............... B60R 22/32 280/803 |

(Continued)

FOREIGN PATENT DOCUMENTS

| | | |
|---|---|---|
| KR | 2002-0051234 A | 6/2002 |
| KR | 2006-0025394 A | 3/2006 |

(Continued)

OTHER PUBLICATIONS

International Search Report and Written Opinion of the ISA for PCT/KR2014/003164, ISA/KR, Daejeon, dated Aug. 13, 2014.

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A D-ring assembly for an inflatable belt of a vehicle includes a patch bracket, in which a portion of the patch bracket supporting a D-ring is inclined forward with respect to a portion of the patch bracket fixed to a pillar of the vehicle; and the D-ring installed at the patch bracket to be rotatable in a left or right direction, so that the two-layer webbing is guided toward the front of a wearer, allowing a passenger to easily wear the webbing.

19 Claims, 4 Drawing Sheets

(56) References Cited

U.S. PATENT DOCUMENTS

| | | | | |
|---|---|---|---|---|
| 4,556,255 A * | 12/1985 | Kawai | B60R 22/203 | 280/801.2 |
| 4,682,790 A * | 7/1987 | Katsuno | B60R 22/20 | 280/801.1 |
| 4,702,491 A * | 10/1987 | Meyer | B60R 22/26 | 280/801.1 |
| 4,776,611 A * | 10/1988 | Tamura | B60R 22/206 | 280/801.2 |
| 4,982,981 A * | 1/1991 | Fourrey | B60R 22/202 | 248/222.52 |
| 5,016,916 A * | 5/1991 | Yokote | B60R 22/20 | 280/801.2 |
| 5,048,866 A * | 9/1991 | Hirasawa | B60R 22/24 | 280/803 |
| 5,096,224 A * | 3/1992 | Murakami | B60R 22/24 | 280/801.1 |
| 5,176,402 A * | 1/1993 | Coulon | B60R 22/26 | 280/807 |
| 5,280,959 A * | 1/1994 | Nanbu | B60R 22/203 | 280/801.1 |
| 5,415,430 A * | 5/1995 | Valasin | B60R 22/22 | 280/801.1 |
| 5,427,412 A * | 6/1995 | Staniszewski | B60R 22/24 | 248/221.12 |
| 5,476,286 A * | 12/1995 | Delfino | B60R 22/20 | 280/801.2 |
| 5,590,907 A * | 1/1997 | McQueen, II | B60R 22/24 | 280/801.2 |
| 5,692,780 A * | 12/1997 | Yasui | B60R 21/055 | 280/801.2 |
| 6,234,529 B1 * | 5/2001 | Ellison | B60R 22/24 | 280/808 |
| 6,733,041 B2 * | 5/2004 | Arnold | B60R 22/203 | 280/801.2 |
| 6,808,225 B2 * | 10/2004 | Moriyama | B60J 5/043 | 296/146.6 |
| 6,860,671 B2 * | 3/2005 | Schulz | B60R 22/24 | 280/801.1 |
| 6,935,701 B1 * | 8/2005 | Arnold | B60R 22/202 | 280/801.2 |
| 7,021,662 B2 * | 4/2006 | Hoffmann | B60R 22/24 | 280/801.2 |
| 7,131,669 B2 * | 11/2006 | Morita | B60R 22/24 | 280/808 |
| 7,156,198 B2 * | 1/2007 | Nishide | B60N 2/002 | 180/273 |
| 7,237,799 B2 * | 7/2007 | Clute | B60R 21/18 | 280/733 |
| 7,309,078 B2 * | 12/2007 | Nagata | B60R 21/213 | 280/728.2 |
| 7,367,590 B2 * | 5/2008 | Koning | B60R 22/18 | 280/801.2 |
| 7,445,244 B2 * | 11/2008 | Taylor | B60R 22/26 | 280/801.2 |
| 7,802,819 B2 * | 9/2010 | Ng | B60R 22/18 | 280/808 |
| 8,136,841 B2 * | 3/2012 | Omiya | B60R 22/203 | 280/801.2 |
| 8,215,189 B2 * | 7/2012 | Maeta | B60R 22/18 | 73/862.391 |
| 8,408,599 B2 * | 4/2013 | Strnad | B60R 22/18 | 280/801.1 |
| 8,678,438 B2 * | 3/2014 | You | B60R 21/055 | 280/801.2 |
| 8,678,439 B2 * | 3/2014 | Marziani | B60R 22/18 | 280/801.1 |
| 8,807,598 B2 * | 8/2014 | Strnad | B60R 22/18 | 280/801.1 |
| 2005/0023815 A1 | 2/2005 | Hoffmann et al. | | |
| 2007/0170712 A1 | 7/2007 | Cord et al. | | |
| 2008/0018088 A1 * | 1/2008 | Gray | B60R 22/03 | 280/808 |
| 2008/0030063 A1 * | 2/2008 | Tabata | B60R 22/201 | 297/468 |
| 2008/0136141 A1 * | 6/2008 | Gray | B60R 22/202 | 280/727 |
| 2010/0052404 A1 | 3/2010 | Ng | | |
| 2011/0062696 A1 | 3/2011 | Strnad et al. | | |

FOREIGN PATENT DOCUMENTS

| | | |
|---|---|---|
| KR | 2006-0069669 A | 6/2006 |
| KR | 2012-0041507 A | 5/2012 |

\* cited by examiner

INFLATABLE BELT D-RING ASSEMBLY FOR A VEHICLE

CROSS REFERENCE TO RELATED APPLICATIONS

This application is a 371 U.S. National Stage of International Application No. PCT/KR2014/003164, filed Apr. 14, 2014, which claims the benefit of Korean Patent Application No. 10-2013-0050925, filed May 6, 2013. The disclosures of the above applications are incorporated herein by reference.

TECHNICAL FIELD

The present invention relates to an inflatable belt D-ring assembly for a vehicle. More particularly, the present invention relates to a D-ring assembly for an inflatable belt of a vehicle including a patch bracket and a D-ring.

BACKGROUND

In general, a seat belt for a vehicle includes a seat belt, a webbing, a retractor, a D-ring, a tongue, and a buckle.

Functions of main components of the seat belt for a vehicle are as follows:

The webbing surrounds the body of a passenger.

The retractor allows the webbing to be tightly strained and in addition, winds a surplus portion of the webbing to keep the surplus portion.

The D-ring is installed in the vehicle to guide the webbing toward the shoulder of a passenger.

The tongue may fix the webbing.

The buckle is fixed to one side of the seat of the vehicle to detachably support the tongue.

Recently, the webbing of the seat belt for a vehicle is configured in a shape of an inflatable bag, and the inflatable belt for a vehicle, in which the inflator is installed to one end of the webbing, is actually applied to a vehicle.

If the inflator is activated by an actuation signal of an ECU (Electric Control Unit) or an IBCU (Inflatable Belt Control Unit) when a vehicle accident occurs, the inflatable belt for a vehicle allows the inflator to generate a high-pressure gas, so that the deflated webbing is inflated by the high-pressure gas.

Thus, the inflatable belt for a vehicle may provide a wearer with a higher level of safety than a seat belt for a vehicle, a webbing of which is not inflated. The basic configuration and operation of the inflatable belt for a vehicle are disclosed in Korean patent publication Nos. 10-1995-0023558 (Published on Aug. 18, 1995) and 10-2012-0041507 (Published on May 2, 2012).

Meanwhile, the inflatable belt for a vehicle includes all main components of the seat belt for a vehicle described above, and further includes an inflator for generating a high-pressure gas which is supplied into the webbing.

The present invention relates to an effective installation of a D-ring which guides a webbing drawn from a retractor of the inflatable belt for a vehicle toward a passenger.

A seat belt for a vehicle is disclosed in Korean unexamined patent publication No. 10-2006-0025394 (Published on Mar. 21, 2006) and an apparatus for guiding a seat belt for a vehicle is disclosed in Korean unexamined patent publication No. 10-2006-0069669 (Published on Jun. 22, 2006).

The D-ring of the seat belt for a vehicle disclosed in Korean unexamined patent publication No. 10-2006-0025394 (Published on Mar. 21, 2006) is connected to a height control apparatus and can move upward and downward.

Thus, according to Korean unexamined patent publication No. 10-2006-0025394, the passenger adjusts the height of the D-ring according the body shape of the passage to effectively wear the webbing.

The D-ring of the seat belt for a vehicle disclosed in Korean unexamined patent publication No. 10-2006-0069669 is freely rotated in left and right directions with respect to a bracket fixed to a pillar of a vehicle.

Thus, according to Korean unexamined patent publication No. 10-2006-0069669, while the D-ring of the seat belt for a vehicle is rotated at a suitable angle according to a passenger's body shape, the D-ring changes the withdrawing direction of the webbing so that effective wear of the webbing may be expected.

RELATED ART (Patent document 1) Korean unexamined patent publication No. 10-1995-0023558 (Published on Aug. 18, 1995)

(Patent document 2) Korean unexamined patent publication No. 10-2012-0041507 (Published on May 2, 2012)

(Patent document 3) Korean unexamined patent publication No. 10-2006-0025394 (Published on Mar. 21, 2006)

(Patent document 4) Korean unexamined patent publication No. 10-2006-0069669 (Published on Jun. 22, 2006)

Technical Problem

However, according to the related art including the patent documents 1 and 2 described above, the D-ring which is installed at a front of the bracket fixed to the pillar of a vehicle is placed in parallel with the pillar.

Thus, the webbing passing through the D-ring is guided toward a side of a wearer, so that it is inconvenient to wear the webbing.

That is, although the webbing must be placed at the front of the wearer, according to the related art, the D-ring guides the webbing toward a side of the wearer.

In addition, the webbing having a shape of an inflatable bag is prepared in a two-layer structure other than a one-layer structure adopted in a conventional seat belt for a vehicle.

Thus, in a case that the related art is applied to an inflatable belt for a vehicle, if the webbing is not smoothly induced toward the front of the wearer when the webbing is withdrawn, it is difficult for the webbing to pass through the D-ring.

For example, while the two-layer webbing is passing through the D-ring, the webbing may be bent or lumped, so that it may be difficult to wear the webbing.

The present invention is provided to solve the above problems.

Accordingly, it is an object of the present invention to provide a D-ring assembly for an inflatable belt of a vehicle which can smoothly guide a two-layer webbing toward a front of a wearer to allow a passenger to easily wear the webbing.

Technical Solution

According to one aspect of the present invention, there is provided a D-ring assembly for an inflatable belt of a vehicle. The D-ring assembly may include a patch bracket in which a portion of the patch bracket supporting a D-ring is inclined forward with respect to a portion of the patch bracket fixed to a pillar of the vehicle; and the D-ring installed at the patch bracket to be rotatable in a left or right direction.

The patch bracket may include a pillar fixing part fixed to the pillar of the vehicle; a horizontal bending part, in which one side the horizontal bending part provided at a lower front end of the pillar fixing part has a width narrower than a width of an opposite side of the pillar fixing part to have a trapezoidal shape; and a D-ring support part vertically bent at a front of the horizontal bending part.

A fixing bolt insertion hole may be formed at the pillar fixing part and a rivet insertion hole may be formed at the D-ring support part.

An inserting protrusion may be formed at a rear of a central portion of an upper end of the pillar fixing part, and a T-shaped lock piece may be provided at a rear of a central portion of a lower end of the D-ring support part in parallel to the inserting protrusion.

The D-ring may include a connection plate connected to the D-ring support part of the patch bracket and a slip guide provided at a lower portion of a front surface of a connection plate.

A gradient angle of the D-ring support part with respect to the pillar fixing part of the patch bracket may be in a range of 5° to 25°.

Advantageous Effects

According to the D-ring assembly for an inflatable belt of a vehicle of the present invention, the D-ring is installed to smoothly induce the webbing toward the front of the wearer when the wearer draws the two-layer webbing to wear the webbing.

Thus, a passenger can more easily wear the webbing.

After completing the wear of the webbing, even when the wearer separates the tongue from the buckle so that the webbing is wound around the retractor, the webbing to can smoothly pass through the D-ring, facilitating the reception and keep of the webbing.

DETAILED DESCRIPTION

Hereinafter, a D-ring assembly for an inflatable belt of a vehicle according to a preferable embodiment of the present invention will be described in more detail with reference to accompanying drawings.

Figure 1:
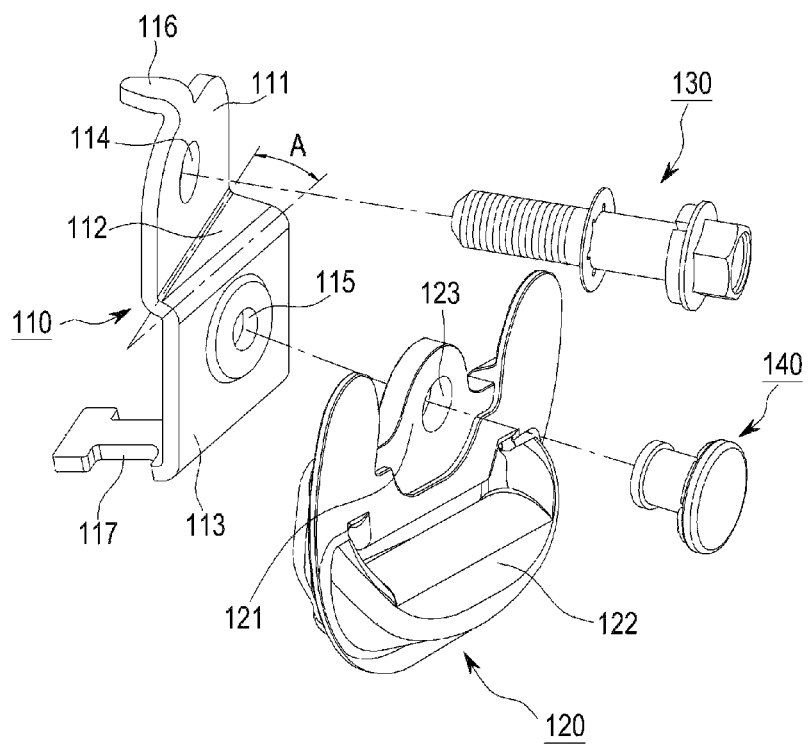
FIG. 1 is an exploded perspective view showing a D-ring assembly for an inflatable belt of a vehicle according to an embodiment of the present invention.

FIG. 1 is an exploded perspective view showing a D-ring assembly for an inflatable belt of a vehicle according to an embodiment of the present invention.

The D-ring assembly 100 for an inflatable belt of a vehicle according to an embodiment of the present invention includes a patch bracket 110 and a D-ring 120.

As shown in FIG. 1, the patch bracket 110 includes a horizontal bending part 112 provided at the front of a lower end of the pillar fixing part 111.

A D-ring support part 113 is vertically bent at the front of the horizontal bending part 112.

The horizontal bending part 112 of the patch bracket 110 has one side having a width narrower than that of the opposite side so that the horizontal bending part 112 has a trapezoidal shape.

Therefore, the D-ring support part 113 is inclined forward at a predetermined tilt angle A with respect to the pillar fixing part 111.

A fixing bolt insertion hole 114 is formed in the pillar fixing part 111 and a rivet insertion hole 115 is formed in the D-ring support part 113.

An inserting protrusion 116 is formed at a rear of a central portion of an upper end of the pillar fixing part 111, and a T-shaped lock piece 117 is provided at a rear of a central portion of a lower end of the D-ring support part 113 in parallel to the inserting protrusion 116.

The patch bracket 110 is fixed to the pillar 400 by using a fixing bolt 130 which passes through the fixing bolt insertion hole 114 prepared at the pillar fixing part 111 to be combined with the pillar 400 of a vehicle.

As shown in FIG. 1, the D-ring includes a slip guide 122 which is provided at a lower portion of a front surface of a connection plate 121 and through which a webbing 300 passes.

A rivet insertion hole 123 is formed at an upper central portion of the connection plate 121 of the D-ring 120.

Figure 2:
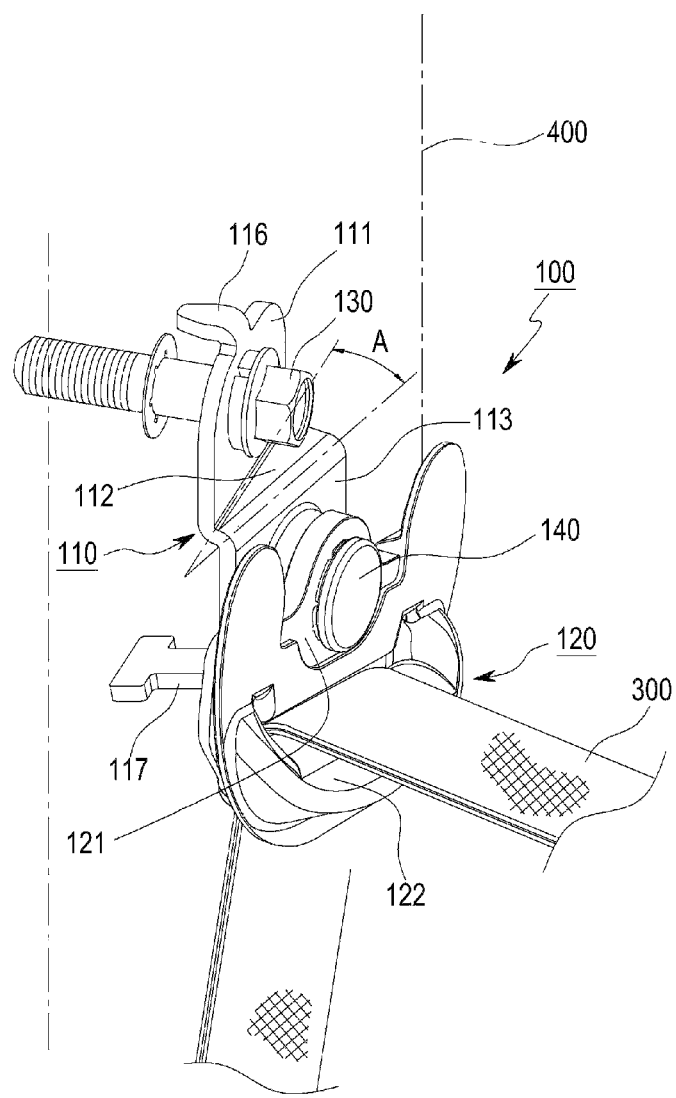
FIG. 2 is a perspective view showing a D-ring assembly for a an inflatable belt of a vehicle according to an embodiment of the present invention.

FIG. 2 is a perspective view showing a D-ring assembly for an inflatable belt of a vehicle according to an embodiment of the present invention.

The D-ring 120 is rotatable in left and right directions and installed at the front of the D-ring support part 113 by using a rivet 140 which passes through the rivet insertion holes 123 and 115 of the connection plate 121 and the patch bracket 110.

As shown in FIG. 2, the D-ring 120 is inclined forward at a predetermined gradient angle A with respect to the pillar fixing part 111 of the patch bracket 110.

Figure 3:
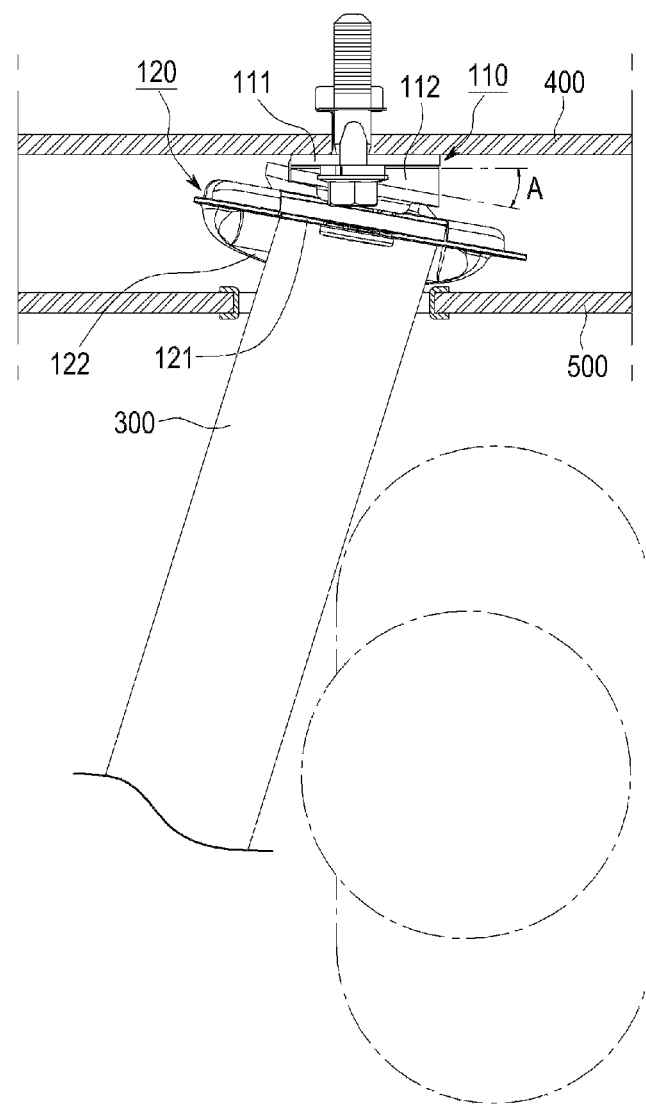
FIG. 3 is a plan view showing the D-ring assembly for an inflatable belt of a vehicle according to an embodiment of the present invention.

FIG. 3 is a plan view showing the D-ring assembly for an inflatable belt of a vehicle according to an embodiment of the present invention.

As shown in FIG. 3, the D-ring support 113 and the D-ring 120 are inclined forward at a predetermined gradient angle A about the pillar fixing part 111 of the patch bracket 110 tightly fixed to the pillar 400 of a vehicle.

Thus, when a user draws the webbing 300 withdrawn inside the vehicle through the slip guide 122 of the D-ring 120 installed at the front of the D-ring support part 113 of the patch bracket 100 in order to wear the webbing 300, the webbing 300 is smoothly induced to the front of the user.

When the webbing 300 is induced toward the front of the user, the webbing 300 is more smoothly withdrawn so that the user can be more easily wear the webbing 300.

Further, the webbing 300 released from the passenger is more stably received.

Meanwhile, the gradient angle A of the D-ring support part 113 with respect to the pillar fixing part 111 of the patch bracket 110, that is, the installation angle of the D-ring 120 with respect to the pillar fixing part 111 of the patch bracket 110 may be adjusted according to a specification of the vehicle.

Preferably, the gradient angle A of the D-ring support part 113 or the installation angle of the D-ring 120 is set to give the passenger with the best withdrawing sense.

For example, the gradient angle A of the D-ring support part 113 may be set in the range of 5° to 25°. Preferably, the gradient angle A is set at 10°.

When the gradient angle A of the D-ring support part 113 is less than 5°, it is difficult to induce the webbing 300 toward the front of the user wearing the webbing 300.

If the gradient angle A of the D-ring support part 113 exceeds 25°, the webbing 300 may deviate far from the body of the wearer.

Reference numeral 500 denotes a pillar trim.

Figure 4:
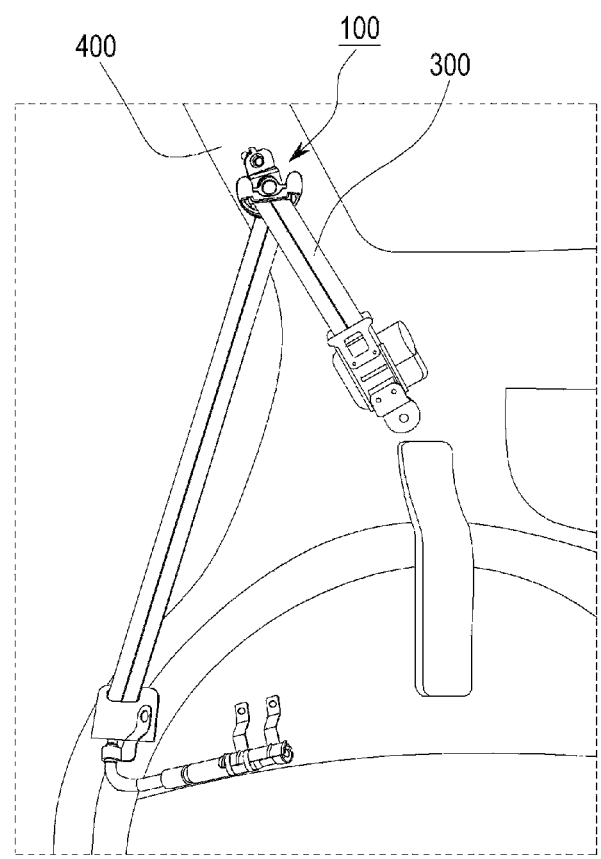
FIG. 4 is a view showing an installed state of the D-ring assembly for an inflatable belt of a vehicle according to an embodiment of the present invention.

FIG. 4 is a view showing an installed state of the D-ring assembly for an inflatable belt of a vehicle according to an embodiment of the present invention.

The D-ring assembly 100 for an inflatable belt of a vehicle may be applied to a commercial seat belt for a vehicle having a one-layer webbing.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A D-ring assembly for a belt of a vehicle, the D-ring assembly comprising:
   a patch bracket including an upper generally planar portion and a lower generally planar portion, the lower generally planar portion forwardly inclined relative to the upper generally planar portion at an acute tilt angle, the upper portion generally planar defining an insertion hole for receiving a fastener along a first axis; and
   a pillar loop supported by the lower generally planar portion for rotation about a second axis,
   wherein the upper generally planar portion and the lower generally planar portion are fixedly oriented relative to one another and the first and second axes are offset relative to one another by the acute tilt angle,
   wherein the upper and lower generally planar portions are connected by an intermediate portion, the intermediate portion being perpendicular to both of the upper and lower generally planar portions, the intermediate portion having a first depth perpendicular to the upper and lower generally planar portions proximate a first lateral side of the patch bracket and a second depth perpendicular to the upper and lower generally planar portions proximate a second lateral side of the patch bracket.

2. The D-ring assembly of claim 1, wherein the tilt angle is at least 5°.

3. A D-ring assembly for a belt of a vehicle, the D-ring assembly comprising:
   a patch bracket including an upper generally planar portion and a lower generally planar portion, the lower generally planar portion forwardly inclined relative to the upper generally planar portion at an acute tilt angle, the upper portion generally planar defining an insertion hole for receiving a fastener along a first axis; and
   a pillar loop supported by the lower generally planar portion for rotation about a second axis,
   wherein the upper generally planar portion and the lower generally planar portion are fixedly oriented relative to one another and the first and second axes are offset relative to one another by the acute tilt angle,
   wherein the upper generally planar portion is a pillar fixing part fixed to the pillar of the vehicle and the lower generally planar portion is a D-ring support part, the D-ring assembly further comprising a horizontal bending part, in which one side the horizontal bending part provided at a lower front end of the pillar fixing part has a width narrower than a width of an opposite side of the pillar fixing part to have a trapezoidal shape; and a D-ring support part vertically bent at a front of the horizontal bending part.

4. The D-ring assembly of claim 3, wherein a fixing bolt insertion hole is formed at the pillar fixing part, and
   a rivet insertion hole is formed at the D-ring support part.

5. The D-ring assembly of claim 3, wherein an inserting protrusion is formed at a rear of a central portion of an upper end of the pillar fixing part, and
   a T-shaped lock piece is provided at a rear of a central portion of a lower end of the D-ring support part in parallel to the inserting protrusion.

6. The D-ring assembly of claim 3, wherein the D-ring includes a connection plate connected to the D-ring support part of the patch bracket and a slip guide provided at a lower portion of a front surface of a connection plate.

7. The D-ring assembly of claim 3, wherein the tilt angle of the D-ring support part with respect to the pillar fixing part of the patch bracket is in a range of 5° to 25°.

8. A bracket for connecting a seat belt D-ring with a pillar of a vehicle, the bracket comprising:
   a first portion for attachment to the pillar of the vehicle, the first portion defining an insertion hole for receiving a fastener along a first axis;
   a second portion for rotatably receiving the seat belt D-ring;
   an intermediate portion interconnecting the first portion and the second portion, the intermediate portion in a plane perpendicular to both the first and second portions establishing a tilt angle between the first and second portions that forwardly angles the second portion relative to the first portion; and
   a pillar loop supported by the second portion for rotation about a second axis,
   wherein the first portion, the second portion and the intermediate portion are fixedly oriented to one another, and further wherein the first and second axes are offset relative to one another by the tilt angle.

9. The bracket of claim 8, wherein the tilt angle is at least 5°.

10. The bracket of claim 8, wherein the first and second portions are planar.

11. The bracket of claim 8, in combination with the seat belt D-ring, the D-ring mounted to the second portion for rotation about the second axis, the second axis perpendicular to the second portion.

12. The bracket of claim 8, wherein the intermediate portion has a first depth adjacent a first lateral side of the bracket and a second depth adjacent a second lateral side of the bracket, the second depth being greater than the first depth.

13. The bracket of claim 8, wherein the tilt angle is an acute angle.

14. The bracket of claim 8, wherein the intermediate portion has a triangular shape in a plane perpendicular to the first and second portions.

15. A bracket for connecting a seat belt D-ring with a pillar of a vehicle, the bracket comprising:
   a first portion for attachment to the pillar of the vehicle, the first portion defining an insertion hole for receiving a fastener along an axis, the first portion in a first vertically oriented plane;

a second portion for rotatably receiving the seat belt D-ring, the second portion in a second vertically oriented plane; and an intermediate portion interconnecting the first portion and the second portion such that an acute tilt angle is established between the first and second portions; and a pillar loop supported by the second portion for rotation about a second axis, wherein the first portion, the second portion and the intermediate portion are fixedly oriented to one another, and further wherein the first and second axes are offset relative to one another by the tilt angle.

16. The bracket of claim 15, wherein the tilt angle is at least 5°.

17. The bracket of claim 15, wherein the tilt angle is between 5° and 25°.

18. The bracket of claim 15, wherein the intermediate portion has a triangular shape and is disposed in a horizontal plane.

19. The bracket of claim 15, wherein the intermediate portion has a first depth adjacent a first lateral side of the bracket and a second depth adjacent a second lateral side of the bracket, the second depth being greater than the first depth.

* * * * *